Jan. 11, 1949.  A. NORIGE  2,458,626
DRILL CHUCK
Filed April 3, 1946 2 Sheets-Sheet 1
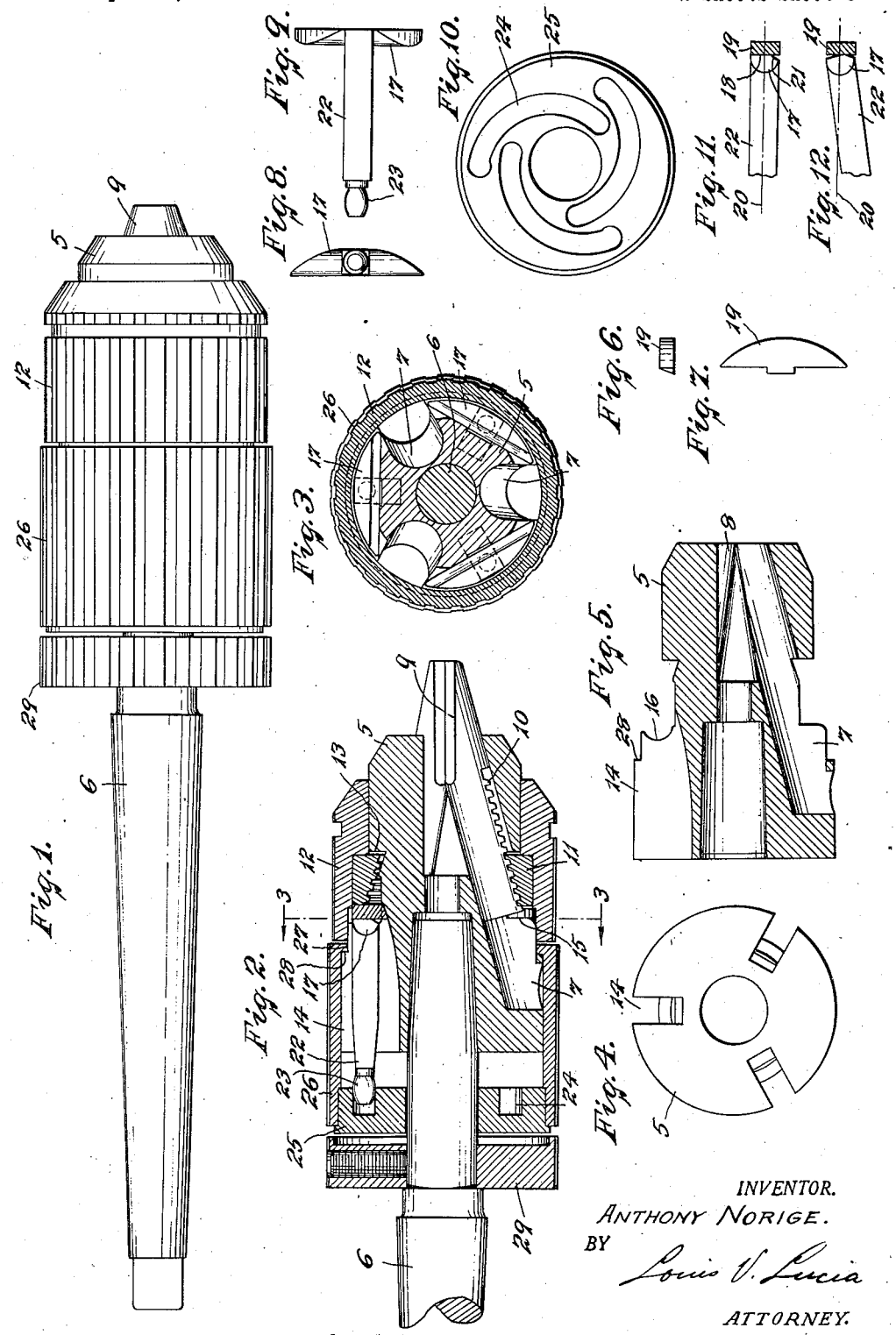
INVENTOR.
ANTHONY NORIGE.
BY
Louis V. Lucia
ATTORNEY.

Jan. 11, 1949.　　　　A. NORIGE　　　　2,458,626
DRILL CHUCK
Filed April 3, 1946　　　　　　　　　　2 Sheets-Sheet 2
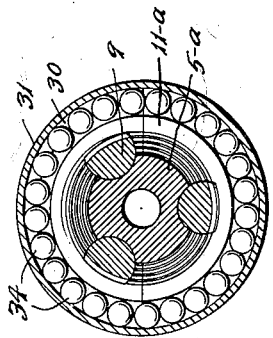
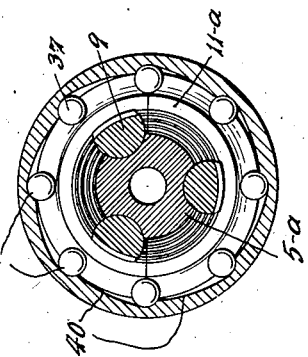
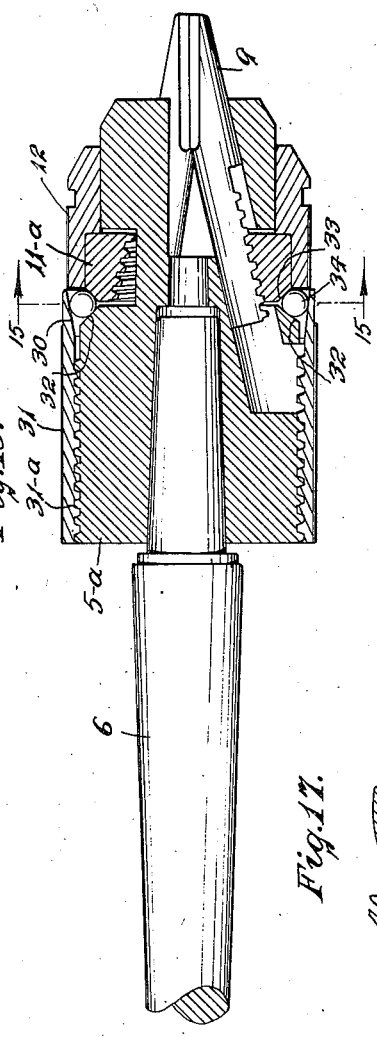
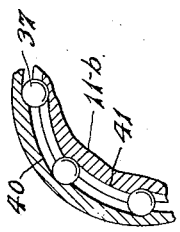
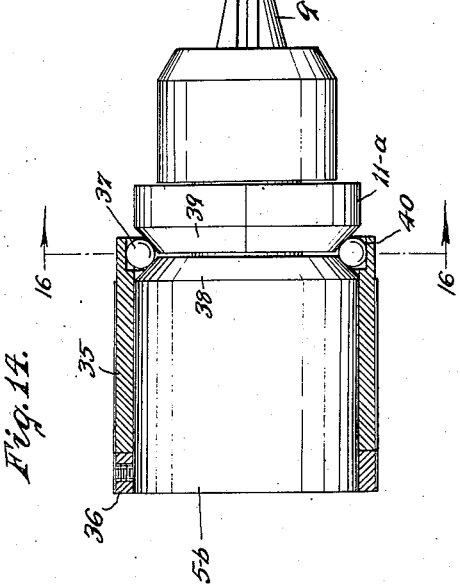
INVENTOR.
ANTHONY NORIGE.
BY
Louis V. Lucia
ATTORNEY.

Patented Jan. 11, 1949

2,458,626

UNITED STATES PATENT OFFICE 2,458,626

DRILL CHUCK

Anthony Norige, East Hartford, Conn.

Application April 3, 1946, Serial No. 659,250

9 Claims. (Cl. 279—64)

This invention relates to drill chucks and more particularly to such chucks as are adapted for the attachment of a cutting tool, such as a drill or the like, by manual operation and without the use of wrenches or other similar devices for tightening the chuck.

An object of my invention, among others, is to provide a chuck of this type which is easy to operate, economical to produce, and which is provided with highly efficient means for firmly tightening the chuck on to the tool by a simple hand operation.

A further object of this invention is to provide a novel hand operated tightening means for tightening the chuck after the tool has been engaged thereby.

Further objects and advantages of my invention will be more clearly understood from the following description and from the accompanying drawings, in which—

Fig. 1 is an elevational side view of a chuck embodying my invention and showing a conventional shank attached thereto.

Fig. 2 is a view in central vertical section through said chuck showing only a portion of the said shank.

Fig. 3 is an end view in vertical section on the line 3—3 of Fig. 2.

Fig. 4 is an elevational end view of the body portion of the chuck.

Fig. 5 is a view of said body portion in central vertical section.

Fig. 6 is an elevational end view of a washer used in my improved construction.

Fig. 7 is an elevational plan view of said washer.

Fig. 8 is an elevational plan view of a camming lever embodied in my invention.

Fig. 9 is an elevational front view of said lever.

Fig. 10 is an elevational plan view of the lever operating member.

Fig. 11 is a diagrammatic side view of a portion of the lever and washer.

Fig. 12 is a similar view showing said lever and washer in a relatively different position.

Fig. 13 is a side view, in central vertical section, of a chuck embodying a modified form of my invention.

Fig. 14 is a side view showing said chuck only partially in central vertical section and illustrating a further modified form of the invention.

Fig. 15 is an end view in section on the line 15—15 of Fig. 13.

Fig. 16 is a similar view on the line 16—16 of Fig. 14.

Fig. 17 is a fragmental end view showing a further modified form of the invention.

As shown in the drawing, my improved chuck comprises a body portion 5 which is attachable to a conventional form of shank such as shown at 6. The said body portion is provided with openings forming runways 7 that extend into a central recess 8 in which are slidably mounted jaws 9 having a series of screw threads 10 in engagement with corresponding threads of a nut 11 that is rigidly secured to a sleeve 12 rotatably mounted upon said body portion, the nut 11 being divided into two halves and attached to the sleeve 12 with a forced fit whereby the said sleeve is retained in rotatable position upon the body 5 by engagement between the said nut and a shoulder 13 in said body.

The body portion 5 is provided with radial slots 14 and an annular shoulder 15 having grooves 16 therein and running transverse to the slots 14. In each of said grooves there is mounted a cam, in the shape of a half round bar 17, having a flat portion 18 which normally rests against a plate 19 that is seated upon the nut 11 and extends slightly beyond the axis of said bar upon which it is rotatable in the groove 16, the said axis being indicated by the line 20 in Figs. 11 and 12.

One side of said bar 17 is relieved, as at 21, and a lever 22, preferably integral with the bar, extends perpendicularly therefrom, through the slots 14 and has a rounded head portion 23 which fits in one of the cam grooves 24 in the operating disk 25 that is carried by an operating sleeve 26 which is rotatable upon the body 5 and retained in position thereon by means of an inwardly extending flange 27 which engages a shoulder 28 and is disposed between said shoulder and the end of the sleeve 12.

If desired, a gripping member 29, which is fixed to the shank 6 by means of a screw, as shown in Fig. 2, is provided for the purpose of manually holding the body 5 and the shank 6 against rotation while the sleeves 12 and 26 are rotated for the operation of the chuck jaws.

In the operation of the chuck above described, the drill or tool, which is to be held in the chuck, is first inserted into the recess 8 between the jaws 9. The operating sleeve 12 is then rotated, turning therewith the nut 11 and moving the jaws outwardly in the body portion 5, within the inwardly inclined runways 7, and thereby closing said jaws against the drill.

When the drill has thus been engaged, by manual operation of the sleeve 12 until it is securely held in the chuck, a final tightening operation may be applied by manual rotation of the operating sleeve 26. This will rotate the cam member 25 and thereby actuate the lever 22 to rock the cam bars 17 on their axis, as illustrated in Fig. 11, and thus move the cam plates 19 against the nut 11, thereby forcing said nut forwardly on the body 5, carrying therewith the jaws 9 and further tightening said jaws into firm engagement with the drill or tool in the chuck.

It will be noted that as the jaws have been closed upon the tool by rotation of the member 12, only a slight further tightening movement of the jaws is required in order to tightly grip the said tool. This is difficult to obtain by further rotation of the sleeve 12 as the jaws are now in engagement with the tool and further movement of the nut for tightening the jaws may be obtained only by the application of a considerable amount of pressure against the nut 11. This pressure may be easily applied by simply rotating the sleeve 16 and therewith the cam member 25 which will cause the rocking of the levers 22, as above described, for rotating the cam bars 27.

It will thus be noted that operation of the levers 22 will apply a very high leverage against the plates 19 and, therethrough, an enormous amount of pressure upon the nut 11 to thereby cause the jaws to be firmly engaged with the drill.

It has been found that my improved chuck may be easily operated with the hand to grip a drill, or other tool, so tightly that the edges of the jaws actually cause imprints in the side of the tool. Also, said chuck can be easily operated with the hand so as to actually grasp a drill much tighter than in conventional chucks with the use of what is commonly known as a chuck wrench.

In the modified form illustrated in Figs. 13 and 15, I provide modified means for camming the nut 11—a in the form of a taper 30 adjacent the end of the sleeve 31 which is threaded to the body portion 5—a. The said body portion is provided with a bevel 32 opposed to a bevel 33 on the nut 11—a and a series of balls 34 are contained between said bevels and the taper 30.

In the operation of this form of my invention, the sleeve 12 is first rotated to rotate the nut 11—a and close the jaws 9 to engage a drill or tool in the chuck. The said jaws may then be further tightened by rotation of the sleeve 31 to cause it to be moved endwise upon the body 5—a, by means of the thread 31—a between said sleeve and body. This will cause the taper 30 to force the balls 34 inwardly against the beveled surfaces 32—33, thus forcing the nut 11—a forwardly and further tightening the jaws as above described.

In the form illustrated in Figs. 14 and 16, the sleeve 35 is rotatable upon the body 5—b, but not threaded thereto, and a collar 36 is secured to said body to retain the sleeve in position. A series of balls 37 are disposed between the bevel 38 on the body and 39 on the nut 11—a, and cam surfaces 40 are provided on the inner surfaces of the sleeve 31 to force said balls inwardly against the tapers 30 and 39 upon rotation of the sleeve for a final tightening operation of the jaws 9.

In the further modified form shown in Fig. 17, there are provided additional camming surfaces 41, on the bevel 39—a of the nut 11—b, which are directed oppositely to the cam surfaces 40 on the sleeve 31 so as to increase the relative movement of the nut upon rotation of said sleeve 31 and insure the rolling of the balls 37.

I claim:

1. A chuck of the character described for a drill or the like comprising a body portion, a plurality of jaws slidably mounted in said body portion, a threaded member rotatable on said body portion and engageable with said jaws for moving the jaws towards closed or opened position, and mechanism including cam means for moving said jaws towards closed position for firmly gripping said drill after the jaws have been brought into engagement therewith.

2. A drill chuck of the character described comprising a body portion having a plurality of jaws slidably mounted therein, a nut rotatable on said body portion and in threaded engagement with said jaws for moving them towards closed or opened position, cam means mounted on said body portion for moving said nut relatively to said body, leverage means extending from said cam means, and means for operating said lever for causing said cam means to move said nut relatively to the body and applying a gripping closing motion to said jaws.

3. A drill chuck of the character described comprising a body portion having a plurality of jaws slidably mounted therein, a nut in threaded engagement with said jaws for moving them towards closed or open position, cam means comprising a member rotatably mounted in said body and adapted to move said nut relatively to said body, a lever extending from said cam means, an operating member rotatable relatively to said body, and cam grooves in said operating member for actuating said lever to rotate said cam means and thereby move said nut and apply a gripping action to said jaws towards closing position.

4. A drill chuck of the character described for a drill or the like comprising a body portion, a plurality of jaws slidably mounted in said body portion, a nut rotatably mounted on said body portion, means for manually operating said nut, cam means rotatably mounted in said body portion, a lever extending from said cam means, an operating member rotatable relatively to said body portion, a cam groove in said member for actuating said lever to operate the cam and thereby move the nut to further close the jaws for a gripping action upon the drill, and means for manually rotating said operating member.

5. A drill chuck of the character described comprising a body portion having a plurality of jaws slidably mounted therein, a nut rotatable on said body portion, a sleeve secured to said nut for manual operation thereof, cam means comprising a substantially semi-circular bar rotatably mounted in said body portion, a lever extending from said cam means, manually operable cam means for operating said lever to actuate said cam, and a buffer plate between said cam and nut for causing operation of the cam to move the nut longitudinally relatively to said body portion and thereby apply supplemental closing motion to cause said jaws to firmly grip said tool.

6. A chuck of the character described comprising a body portion, a plurality of jaws in said body portion, manually operable means for moving said jaws towards closed and opened position, separate manually operable means for further closing said jaws, cam means actuated by said separate means for increasing the pressure manually applied to said jaws to cause them to firmly grip said tool by supplemental closing operation of the jaws, and means for manually holding said body portion against rotation during the operation of the manually operable means.

7. A chuck of the character described comprising a body portion having a plurality of jaws slidably mounted therein, a nut for moving said jaws towards closed or opened position, opposed cam means between said nut and body portion, a manually operable member threaded to said body portion, a taper in said member, and a plurality of movable cams between said taper and bevels for moving the nut relatively to said body portion upon rotation of said sleeve to cause inward movement of the movable members by the taper.

8. A chuck of the character described comprising a body, a plurality of jaws slidably mounted in said body, a nut for moving said jaws towards closed or opened position, opposed bevels between said nut and body portion, a series of balls positioned in abutment with said bevels, a manually operable sleeve threaded to said body portion and adapted to move longitudinally thereon upon rotation, and a taper on said sleeve adapted, upon rotation of said sleeve, to force said balls inwardly against the bevels and thereby forcibly move said nut towards jaw closing position.

9. A drill chuck of the character described comprising a body portion, a plurality of jaws slidably mounted in said body portion, a nut for moving said jaws towards closed or opened position, cam surfaces on said nut, opposed cam surfaces on said body portion, a sleeve rotatable on said body portion, a plurality of balls located between said opposed cam surfaces, and cam surfaces on said sleeves for forcing said balls inwardly against the opposed cam surfaces and thereby forcibly moving said nut for further closing movement of said jaws.

ANTHONY NORIGE.

REFERENCES CITED

The following references are of record in the file of this patent:

UNITED STATES PATENTS

| Number | Name | Date |
|---|---|---|
| 299,964 | Crary | June 10, 1884 |
| 1,227,533 | Ebert | May 22, 1917 |
| 1,940,405 | Englund | Dec. 19, 1933 |
| 2,042,197 | Stoner | May 26, 1936 |
| 2,292,470 | Ostberg | Aug. 11, 1942 |